July 10, 1962 J. T. GRAHAM ET AL 3,043,417
CONVEYING ARRANGEMENTS FOR WORKPIECES
Filed April 29, 1960 3 Sheets-Sheet 1
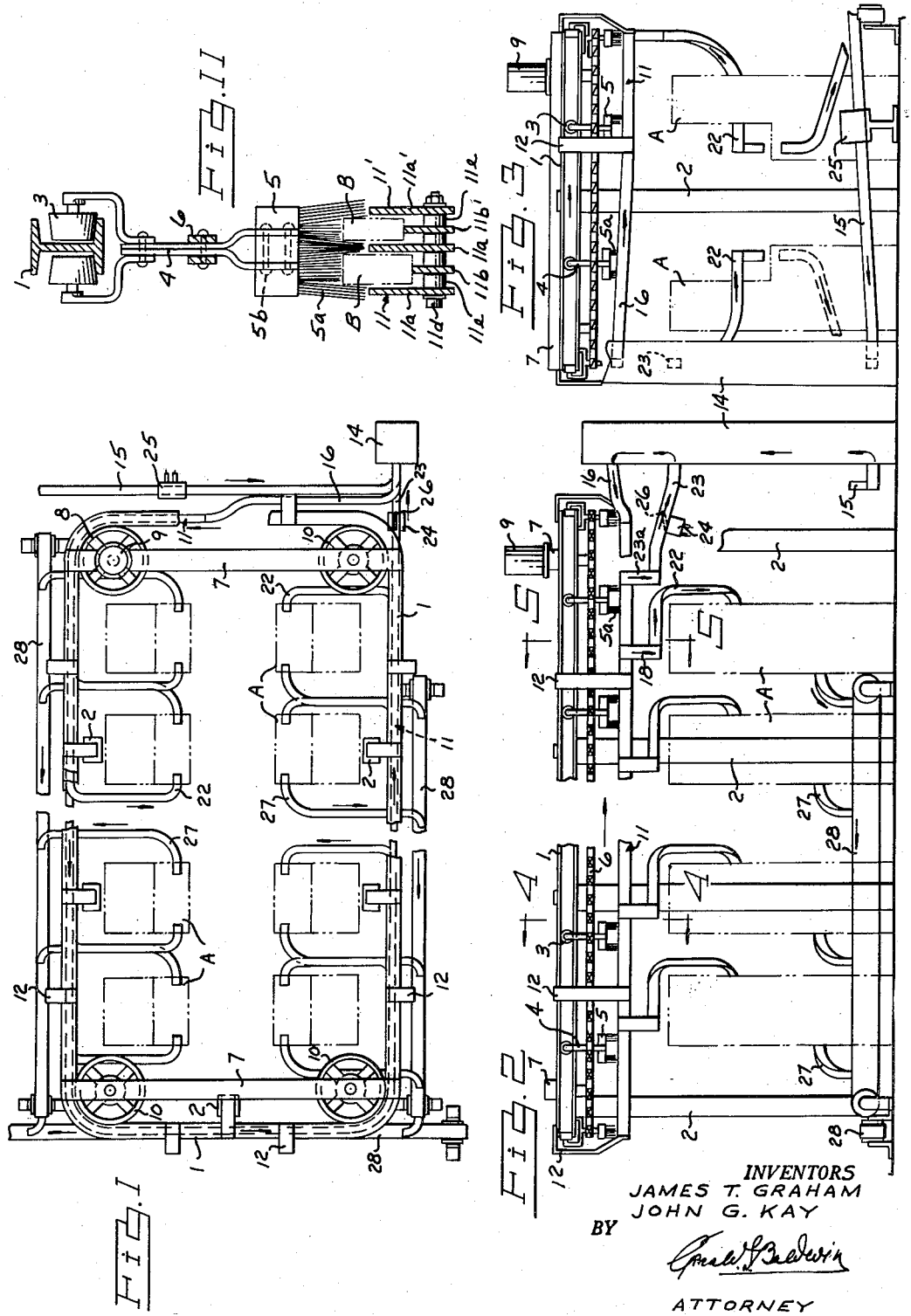
INVENTORS
JAMES T. GRAHAM
JOHN G. KAY
BY
ATTORNEY

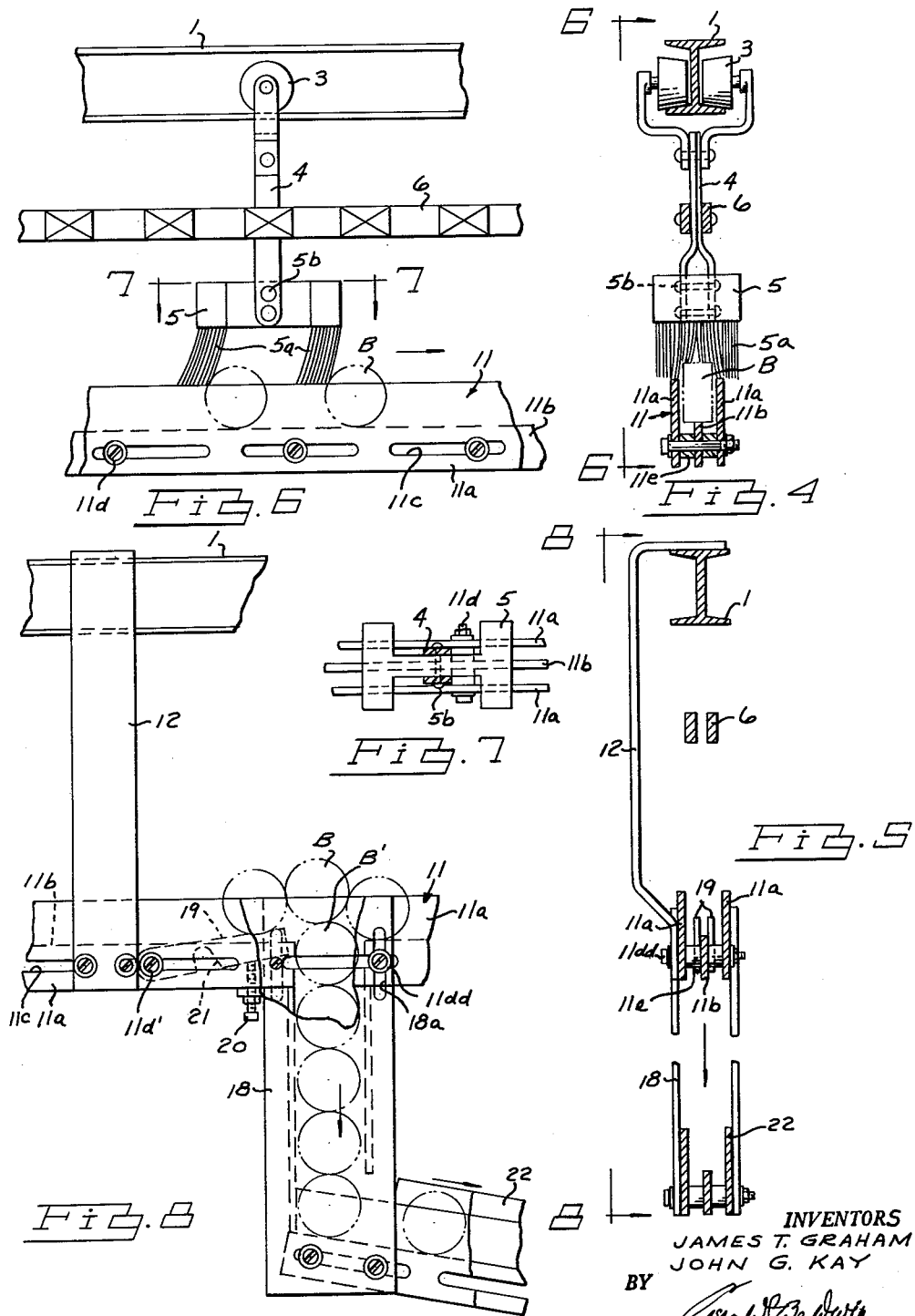

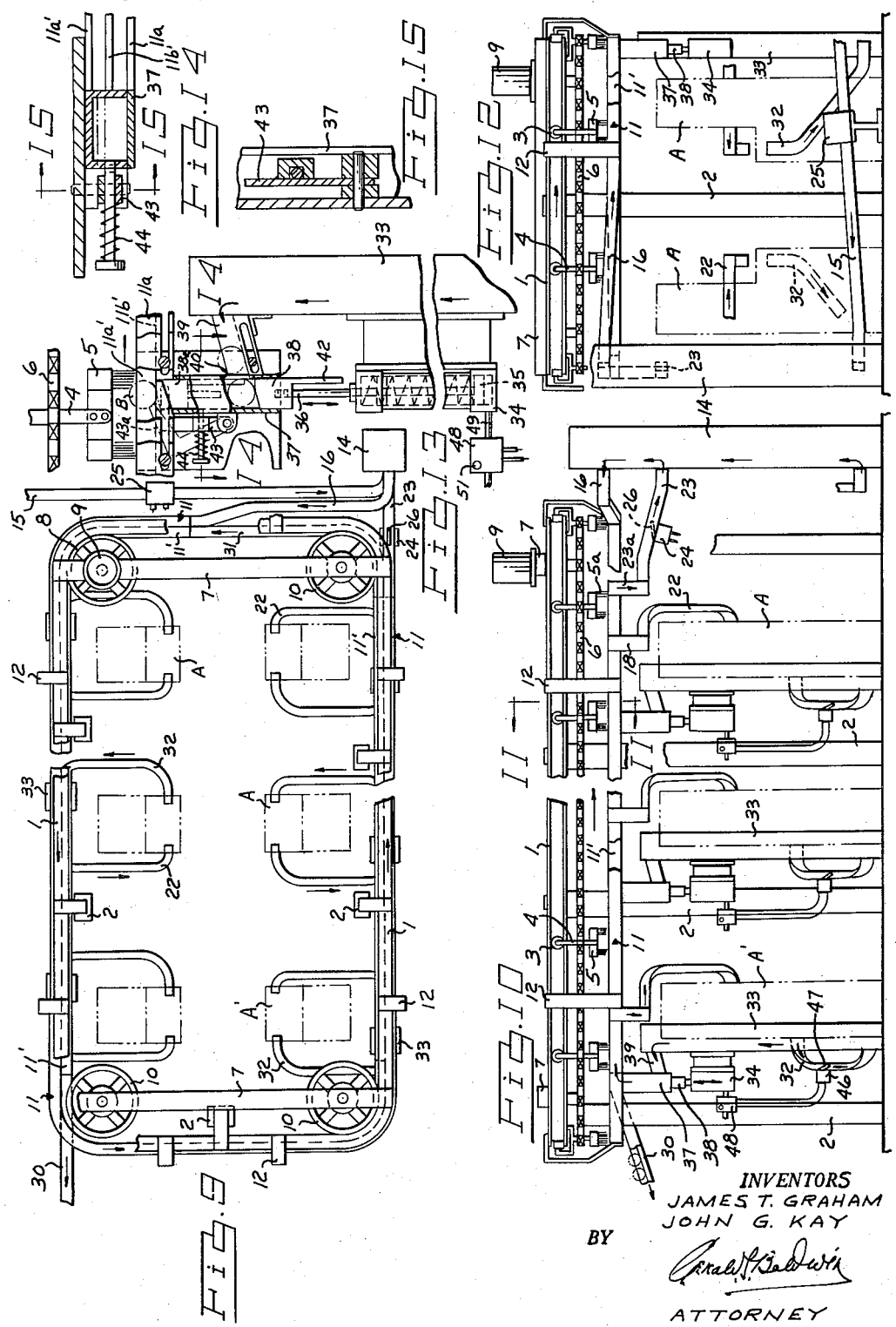

United States Patent Office 3,043,417
Patented July 10, 1962

3,043,417
CONVEYING ARRANGEMENTS FOR WORKPIECES
James T. Graham, Southfield Township, Oakland County, and John G. Kay, Detroit, Mich., assignors to F. Jos. Lamb Company, Detroit, Mich., a corporation of Michigan
Filed Apr. 29, 1960, Ser. No. 25,701
11 Claims. (Cl. 198—85)

This invention relates to improvements in conveying arrangements. At the present time conveyors may be broadly divided into two kinds: Power driven chain conveyors and gravity chuting. If workpieces are to be discharged at a substantially uniform height from various intermediate points along a long and tortuous path gravity chuting cannot be employed because the farther the chuting extends the lower it becomes. If a power driven conveyor were employed it would involve the use of a plurality of straight sections and suitable means for plowing workpieces from one section to the other. Not only is such an installation very costly in the first place and consumes a great deal of power for its operation, but it is also very cumbersome and occupies a great deal of space. Again it would not be practical to utilize a monorail for dispatching small workpieces in process of manufacture from one bank of automated machines to another.

It is therefore an object of the invention to provide a continuous conveying arrangement whereby workpieces may be transported along a horizontal, tortuous path and discharged therefrom at various intermediate points therealong.

Another object of the invention is to provide such a conveying arrangement the first cost of which is relatively small, and which requires only a very small amount of power for its operation.

A further object of the invention is to provide a conveying arrangement including chuting which may be shaped according to the path which workpieces are to follow, to mount a monorail above and in vertical alignment with the chuting, and to provide brushes to travel along the monorail and sweep the workpieces along the chuting.

Another object of the invention is to provide such a conveying means wherein provision is made for delivering workpieces onto one extremity of the chuting in such a manner that the operation of the brushes is not interfered with.

Yet another object of the invention is to provide a conveying means wherein multiple chuting including a plurality of parallel runways is mounted to extend along a predetermined path, to provide a monorail above and in vertical alignment with the multiple chuting, and to mount a plurality of brushes for movement along the monorail so that each brush extends across the runways and sweeps workpieces simultaneously along them.

Another object of the invention is to provide a conveying arrangement including horizontal chuting, to provide a monorail above and in vertical alignment therewith, to mount depending brushes on the monorail for movement therealong, and to provide automatic means intermediately of the length of the chuting for delivering workpieces thereonto from beneath.

With these and other objects and advantages in view which will become apparent as the specifications proceed, the invention is now more fully described with the aid of the accompanying drawings, in which:

FIGURE 1 is a plan view of the invention,
FIGURE 2 is a side view, and
FIGURE 3 is an end view thereof.
FIGURES 4 and 5 are enlarged sections on the lines 4—4 and 5—5, respectively, of FIGURE 2.

FIGURE 6 is a side view on the line 6—6 of FIGURE 4.
FIGURE 7 is a section on the line 7—7 of FIGURE 6, and
FIGURE 8 is a side view on the line 8—8 of FIGURE 5.
FIGURE 9 is a plan view of the invention showing a slight modification, and
FIGURE 10 is a side view thereof.
FIGURE 11 is an enlarged section on the line 11—11 of FIGURE 10.
FIGURE 12 is an end view of FIGURE 9.
FIGURE 13 is an enlarged view showing the loading means for the auxiliary chuting, partly in section.
FIGURE 14 is a section on the line 14—14 of FIGURE 13, and FIGURE 15 is a section on the line 15—15 of FIGURE 14.

Referring to the drawings, 1 designates an endless I-beam monorail which is horizontal throughout its length and is supported by posts 2. Mounted to travel along the lower flanges of the monorail are wheels 3 of carriers 4 having brushes 5 dependingly secured thereto as by rivets 5b. The carriers 4 are retained in spaced relation by an endless chain 6. Secured to and extending across the monorail 1 are horizontal beams 7 on which a drive sprocket 8 and idler sprockets 10 are mounted for rotation. The drive sprocket is rotated by a motor driven speed reducer 9 also mounted on one of the beams. The endess chain passes around the sprockets and is driven by the sprocket 8. Horizontal chuting 11 is dependingly supported by spaced hangers 12 extending from the monorail. The monorail, the brushes and the chuting are all substantially in vertical alignment.

Mounted adjacent the monorail 1 is an elevator 14 to which a bottom feed chute 15 is connected for delivery of workpieces B thereinto, and projecting from the elevator at a higher level is a gravity feed chute 16 which terminates at its lower extremity in and is connected to one end of the chuting 11 for discharge of workpieces thereonto. The gravity chute is substantially level and laterally somewhat offset adjacent the chuting, and the higher portion of the gravity chute does not extend beneath the monorail and consequently travel of the brushes is not impeded thereby. The brushes each include a plurality of sets of bristles 5a arranged in tandem as such arrangement facilitates the propulsion of workpieces around the chuting particularly when the said workpieces are relatively close together.

The chuting shown in the drawing includes parallel side rails 11a having a carrier rail or runway 11b spaced between them along which workpieces are adapted to travel. 11c denotes longitudinal slots formed through the rails 11a and 11b for the passage of bolts 11d having spacers 11e thereon to retain the rails parallel with one another. The height of the side rails 11a is usually such that the workpieces extend above them, and the bristles project downwardly to about the top of the side rails. The bristles are preferably made of nylon, and are both strong and resilient so that they are not easily deflected from their path of travel.

Adjacent each machine A to which workpieces B are to be delivered a sufficient length of the carrier rail 11b is removed to permit passing workpieces to drop therethrough, secured to the rails 11a and 11b by bolts 11dd, shown in FIGURE 8, adjacent opposite sides of the gap thus formed in the carrier rail 11b are opposite sides of a tubular down chute 18. The bolts 11dd extend through chuting slots 11c and also through vertical slots 18a formed through the down chute, so that the vertical distance to the bottom of the latter may be adjusted. By this adjustment the down chute 18 may be so set that a top workpiece B′ therein, when the chute is full, projects slightly above the top of the carrier rail to permit other workpieces following along the chuting to be readily swept thereover. Mounted for longitudinal sliding movement across the gap in the carrier rail over each down chute are opposed guide plates 19 which are pivotally supported on a bolt 11d' immediately behind the down chute, as shown in FIGURES 8 and 5. These guide plates are supported intermediately of their length by set screws 20 carried by the guide rails 11a for vertical adjustment so that the outer extremities of the plates may be held sufficiently raised for workpieces passing along them to approach the top workpiece B' at such an elevation that they may be readily swept thereover. When the machine adjacent that down chute is closed down, or for some reason workpieces are not to be delivered to it, the guide plates 19 and the bolt 11d' are slid along the chuting 11, to the right in FIGURE 8, until the said plates bridge the top of the down chute, at which time the screws 20 are adjusted downward so that the slots 21 in the undersides of the plates engage the adjacent bolt 11dd. Then the tops of the said plates are substantially in alignment with the upper face of the carrier rail. Extending from the underside of each down chute is other chuting 22 of any preferred form the opposite extremity of which terminates adjacent and delivers workpieces to a conventional loading mechanism (not shown) on the adjacent machine A.

Workpieces which have been swept around the entire length of the chuting 11, due to the down chutes having been either filled or closed, pass into a discharge chute 23 by which they are returned into the elevator 14 at an intermediate height for delivery once again into the top feed chute 16 whence they pass to the chuting 11 for recirculation. It will be noted that the extremity of the chuting 11 adjacent the discharge chute 23 is connected to the latter by a suitable down chute 23a to position the said discharge chute to enter the elevator 14 beneath the top feed chute 16.

In order to restrict the number of workpieces passing around the chuting 11 means are provided for controlling the flow of fresh workpieces passing through the bottom feed chute 15 into the elevator 14. In the present instance this is accomplished by providing a delayed action switch 24 which is normally open on the discharge chute 23. This switch is electrically connected to a power driven escapement 25 on the bottom feed chute to control the passing of workpieces through the latter. When the equipment is first started workpieces pass from the bottom feed chute through the elevator to the chuting 11, but when workpieces pass from the latter through the discharge chute for recirculation an actuating arm 26 on the switch 24 which projects into the chute 23 is tripped by them and halts the operation of the escapement. The switch re-opens after a predetermined lapse of time after the passage of one or more workpieces through the discharge chute so that then other workpieces from the bottom feed chute are again delivered to and through the elevator 14 into the chuting 11.

In the arrangement shown in FIGURES 1 to 8, inclusive, processed workpieces from the machines A pass through chuting 27 onto a conventional floor conveyor 28 for delivery to a desired destination.

Referring now to the modification shown in FIGURES 9 to 15, inclusive, the chuting 11 extends as before from the gravity feed chute 16 to the down chute 23a, but in this instance along portions of its length auxiliary chuting 11' is secured thereto. This auxiliary chuting consists of a second carrier rail or runway 11b' and another side rail 11a' spaced outwardly from one of the side rails 11a and from one another by additional spacers 11e on the bolts 11d, as shown in FIGURE 11. Thus one side rail of the chuting 11 also forms one side of the auxiliary chuting 11', and the multiple chuting thus formed minimizes the total width of the two chutings along which workpieces are swept by the same brushes 5.

One length of this multiple chuting extends from the junction of the gravity feed chute 16 with the chuting 11 to the junction of the auxiliary chuting 11' with a delivery chute 30 along which processed workpieces are discharged; and the other length of multiple chuting extends from adjacent the machine A' to the junction of the chuting 11 with the down chute 23a. The adjacent extremities of the auxiliary chuting in the two lengths of multiple chuting, that is between the down chute 23a and the discharge end of the feed chute 16, are connected by other chuting 31, preferably similar in cross section to the chuting 11, which extends in vertical alignment to the monorail 1.

Extending downwardly from a conventional unloader (not shown) on each machine A and A', and shown in FIGURES 9, 10 and 12, is a discharge chute 32 which terminates at its opposite extremity in an elevator 33 to feed workpieces one at a time thereinto. Mounted on one side of the elevator is a vertical cylinder 34 having a piston 35 therein from which a rod 36 projects upwardly. Dependingly mounted on the auxiliary chuting 11' with its upper extremity terminating in the latter is a non-circular tubular housing 37 in which a plunger 38 secured on the upper extremity of the rod 36 is mounted for reciprocation. Extending from an outlet adjacent the top of the elevator 33 is a gravity chute 39 which terminates at its opposite extremity in registry with an opening 40 formed through the adjacent side of the housing so that workpieces discharged from the elevator pass thereinto. The opening 40 is positioned just above the plunger when it is at its bottom position so that workpieces enter the housing and are raised by the plunger to substantially the same level as workpieces passing along the auxiliary chuting. Depending from the plunger is an apron 42 which prevents workpieces passing into the housing when the plunger is raised.

A portion of the carrier rail 11b' is removed to form a gap in the auxiliary chuting across the width of the housing to permit the plunger to lift a workpiece thereon into position to be swept along the chuting by the brushes 5. Pivotally mounted on the side of the housing 37 towards which the workpieces travelling along the auxiliary chuting approach is a latch 43 which normally extends across the gap formed in the carrier rail 11b' and constitutes a bridge across which workpieces are adapted to be swept, and 44 denotes a spring which normally retains the latch horizontal in its gap bridging position. The latch is moved pivotally upward against the tension of the spring 44 by a workpiece upon the plunger as the latter approaches its top position 38a, and as the top position is reached the latch swings somewhat inwardly to its position shown at 43a to bear against a workpiece B upon the plunger beneath the horizontal axis of the said workpiece, which is of course in this case circular. Meanwhile the opposite side of the workpiece beneath its horizontal axis rests adjacent the upper margin of the housing. Inward movement of the latch not only prevents the workpiece dropping down into the housing as the plunger commences its downward movement but also normally forces the workpiece across the gap and along the chuting—to the right in FIGURE 13. However should the latch as it travels towards its horizontal gap-closing position pass beneath the workpiece and leave the latter thereon, as may occasionally happen, the next passing brush sweeps it into and along the chuting.

The piston 35 is operated as follows: Mounted on each discharge chute 32 is an electric switch 46 having an actuating arm 47 which extends into the said chute in the path of workpieces passing therethrough, so that each time a workpiece passes the switch is tripped. The switch is connected to an electrically operated fluid pressure valve 48 mounted in a fluid pressure line 49 connected to the cylinder 34 so that when the switch is closed the valve is opened and the piston 35 is moved upwardly. Thus tripping the switch by one workpiece on its way to the elevator 33 causes the lifting of another workpiece already on the plunger 38 into the auxiliary chuting 11'. The valve 48 is also provided with a conventional valve operating button 51 for also actuating the piston 35. This button may be operated for discharging a final workpiece from the housing after the machine A, or A', has ceased operation.

While in the foregoing the preferred embodiments of the invention have been described and shown, it is understood that alterations and modifications may be made thereto provided the said alterations and modifications fall within the scope of the appended claims.

What we claim is:

1. A conveyor arrangement including an endless monorail, carriers mounted on the monorail for movement therealong, means for moving the carriers along said monorail in spaced-apart relation, chuting along which workpieces may travel supported beneath and in uniformly spaced relation to the monorail, brushes mounted on the carriers and positioned to sweep workpieces along the chuting, an elevator for raising workpieces for delivery to the chuting, means for transferring workpieces from the upper end of the elevator to one extremity of said chuting, means for delivering workpieces to the lower end of said elevator, a passage in said elevator for admitting workpieces thereto at a point intermediate said upper and lower ends of the elevator, a discharge chute extending from the opposite extremity of said chuting to said passage for returning workpieces from the chuting to the elevator to be recirculated on to said first mentioned extremity of the chuting.

2. The combination in claim 1 wherein said discharge chute is provided with switch means for detecting the presence of workpieces within said chute, and said means for delivering workpieces to the lower end of said elevator includes mechanism coupled to said switch and responsive to the operation of the switch to prevent the admission of workpieces to the lower end of the elevator.

3. The combination in claim 1 wherein the means for delivering workpieces from the upper end of the elevator to the chuting comprises a gravity feed chute extending downwardly from the upper end of the elevator to a point adjacent the chuting and terminating at the chuting in a substantially horizontal portion laterally offset from the chuting to permit unimpeded passage of the brushes past said gravity feed chute.

4. The combination in claim 1 wherein the chuting includes a plurality of parallel runways along each of which workpieces may travel, and wherein each of said brushes extends completely transversely across said runways and is positioned to sweep workpieces along all of the runways simultaneously.

5. The combination in claim 1, wherein the means for delivering workpieces from the upper end of the elevator onto the chuting includes a gravity chute connected at its lower extremity to one end of the chuting, adjacent the chuting said gravity chute being substantially horizontal and laterally somewhat offset thereto to permit unimpeded passage of the brushes as they approach said one extremity of the chuting.

6. The combination in claim 4, including a tubular housing depending from the chuting and having its upper extremity substantially in alignment with one of said runways of the chuting along which workpieces are adapted to travel, the chuting being apertured to form a gap in the runway for the passage of a workpiece thereinto from the housing, said housing being apertured for the passage of a workpiece thereinto, reciprocating means in the housing for lifting a workpiece thereon to the level of the runway, a latch pivoted on one side of the housing normally extending horizontally across the gap to form a bridge over which workpieces are adapted to be swept by the brushes, spring means connected to the latch tending to retain it in its horizontal position, said latch being adapted to be thrust upwardly about its pivot axis by a workpiece on the reciprocating means as said means approaches its upper limit of travel until said workpiece is substantially in alignment with the runway, so that upon commencement of the downstroke of the reciprocating means the latch propels the lifted workpiece across the gap and along the runway as said latch moves towards its gap closing position.

7. A conveyor arrangement comprising an endless monorail, carriers mounted on the monorail for movement therealong, means for moving the carriers along the monorail in spaced-apart relation, chuting dependingly secured to the monorail and extending uniformly spaced therefrom, said chuting including a runway along which workpieces may travel, brushes mounted on each carrier and positioned to sweep workpieces along said chuting, a vertical aperture in said runway through which workpieces travelling along the same may drop, a vertical down chute secured dependingly to said chuting having an upper end in register with said aperture, said down chute being vertically adjustable relative to said runway, and means connected to the chuting and shiftable toward and away from said aperture for selectively opening and closing the aperture.

8. A conveyor arrangement comprising an endless monorail, carriers mounted on the monorail for movement therealong, means for moving the carriers along the monorail in spaced-apart relation, multiple chuting having a plurality of runways along each of which workpieces may travel secured to the monorail and extending in uniformly spaced relation therebelow, brushes mounted on each carrier and extending transversely across said chuting and spaced thereabove to sweep workpieces along all of said runways simultaneously, means for delivering workpieces to one of said runways including an elevator for raising workpieces to the runway from a point therebelow, said one runway having an aperture therein spaced from said delivering means through which workpieces may pass to a station beneath the conveyor, a tubular housing dependingly supported below a second runway, said second runway having an aperture therethrough communicating with said housing, a plunger in the housing, means for transferring workpieces from said station to said housing, said plunger being reciprocable within the housing to elevate a workpiece therein to a position upon said second runway, and means mounted on said second runway for preventing passage of workpieces therefrom into said housing or permitting transfer of workpieces from the housing on to the runway.

9. Means for delivering circular workpieces onto a conveyor including chuting having a gap formed vertically through its runway, a tubular housing depending from the chuting and having its upper margin substantially in alignment with the runway, said housing occupying said gap, a spring actuated latch pivoted on one side of the housing normally extending across said gap horizontally for workpieces to pass thereover, a plunger in the housing, said housing being laterally apertured for the passage of a workpiece therethrough onto the plunger, means for reciprocating the plunger, and said plunger being adapted to raise a workpiece thereon to move the latch upwardly about its axis whereupon said workpiece assumes a position substantially in horizontal alignment with the runway, and upon commencement of downward movement of the plunger the latch is adapted to force the workpiece across the gap and along the runway.

10. The combination in claim 9, including means for supporting brushes for movement longitudinally above the chuting for sweeping the workpieces therealong, said brushes being adapted to urge the workpieces lifted by the plunger into alignment with the runway across the gap.

11. Means for discharging workpieces from a conveyor, including chuting along which workpieces are adapted to travel, said chuting having a gap formed vertically through its runway through which a workpiece is adapted to drop and a down chute beneath the gap mounted for vertical adjustment on the chuting whereby the height of the top workpiece in the down chute may be adjusted to permit following workpieces travelling along the chuting to pass thereover, a pivot mounting longitudinally slidable along the chuting, guide plates pivoted on the mounting for sliding movement along the chuting whereby said plates may be positioned to bridge said gap, and means on the chuting for supporting the outer extremities of the plates in their gap-bridging position.

References Cited in the file of this patent

UNITED STATES PATENTS

| | | |
|---|---|---|
| 723,971 | Acklin | Mar. 31, 1903 |
| 1,408,861 | Burkart | Mar. 7, 1922 |
| 2,037,931 | Schmidt | Apr. 21, 1936 |
| 2,519,970 | Lang | Aug. 22, 1950 |
| 2,576,366 | Smith | Nov. 27, 1951 |
| 2,924,325 | Kay et al. | Feb. 9, 1960 |

FOREIGN PATENTS

| | | |
|---|---|---|
| 102,588 | Austria | Feb. 25, 1926 |